United States Patent [19]

Bergland et al.

[11] Patent Number: 5,600,738
[45] Date of Patent: Feb. 4, 1997

[54] POLARIZATION DISPERSION COMPENSATION FOR OPTICAL DEVICES

[75] Inventors: Glenn D. Bergland, Berkeley Heights; Fred L. Heismann, Freehold; Steven K. Korotky, Toms River, all of N.J.; Edmond J. Murphy, Bethlehem, Pa.

[73] Assignee: Lucent Technologies Inc., Murray Hill, N.J.

[21] Appl. No.: 366,935

[22] Filed: Dec. 30, 1994

[51] Int. Cl.⁶ .................................................. G02B 6/126
[52] U.S. Cl. ................................ 385/11; 385/31; 385/45; 385/50
[58] Field of Search .................................. 385/11, 16, 15, 385/23, 31, 45, 50, 129

[56] References Cited

U.S. PATENT DOCUMENTS

| 4,262,994 | 4/1981 | Sheem .................................. 385/129 X |
| 4,978,189 | 12/1990 | Blonder et al. ......................... 385/16 X |
| 5,317,658 | 5/1994 | Bergland et al. .......................... 385/16 |

FOREIGN PATENT DOCUMENTS

0566800A1 10/1993 European Pat. Off. .
63-157133 6/1988 Japan .

OTHER PUBLICATIONS

"Pigtailed Tree–Structured 8 x 8 LiNbO₃ Switch Matrix with 112 Digital Optical Switches", P. Granestrand et al., IEEE Photonics Technology Letters, vol. 6, No. 1, Jan. 1994.

*Primary Examiner*—Rodney B. Bovernick
*Assistant Examiner*—Phan T. H. Palmer

[57] ABSTRACT

An optical device having a first substrate having a fast optical axis and a slow optical axis and a first end and a second substrate having a fast optical axis and a slow optical axis and a second end, the second end is positioned adjacent to the first end such that the fast optical axis of the first substrate is coupled to the slow optical axis of the second substrate and the slow optical axis of the first substrate is coupled to the fast optical axis of the second substrate, thereby permitting an optical signal to pass between the first and second substrates. The first substrate and the second substrate have substantially equal length to thereby substantially eliminate polarization dispersion.

25 Claims, 2 Drawing Sheets

POLARIZATION DISPERSION COMPENSATION FOR OPTICAL DEVICES

BACKGROUND OF THE INVENTION

1. Field of the Invention

The field of the invention generally relates to optical devices, and more particularly, to lithium niobate (LiNbO$_3$) optical waveguide couplers and switches.

2. Related Art

Lithium niobate is the material of choice for many optical switching applications. It has currently reached a state of device and process maturity that exceeds other competing technologies. There are many potential applications in which lithium niobate waveguide devices are in systems to switch, modulate, or process optical signals with one specific state of polarization. (For example, see Watson et al., "A Low Voltage 8×8 Ti:LiNbO$_3$ Switch with a Dilated-Benes Architecture", IEEE *Journal of Lightwave Technology*, Vol. 8, No. 5, May 1990.) Single polarization modulators, switches, and switch matrices in lithium niobate are now common. However, single polarization causes a problem from a systems applications point of view, in that polarization of the light must be maintained throughout the system, which is both difficult and expensive. System architectures have been designed that split, separately switch, and then recombine the two states of polarization to avoid polarization dispersion problems. (For example, see U.S. Patent to Bergland et al., U.S. Pat. No. 5,317,658). However, such systems significantly increase system cost because they double the number of required switch modules.

To eliminate the problems associated with single polarization switches, polarization-independent modulators and switches have been developed. An example 2×2 lithium niobate polarization-independent switch is part number A-4335, sold by AT&T Lightwave Business Unit in Breinigsville, Pa. An example of a large array of polarization-independent switches is Granestrand et al., "Pigtailed Tree-Structured 8×8 LiNbO$_3$ Switch Matrix with 112 Digital Optical Switches", IEEE *Photonics Technology Letters*, Vol. 6, No. 1, January 1994.

These devices eliminate the polarization dependent switch problem but introduce a significant but more subtle problem of polarization dispersion. Lithium niobate is birefringent, which means that two states of polarization pass through the waveguide at different speeds thus causing them to spread in time. This phenomenon is known as polarization dispersion. It can limit system performance by spreading out high speed data signals. When adjacent pulses start to overlap, data transmission errors occur. Polarization dispersion can also result in non-birefringent materials when the waveguide fabrication process introduces birefringence. This birefringence is generally less than material birefringence but it can have an impact on devices. Therefore, what is desired is a technique that compensates for polarization dispersion and eliminates its deleterious effects.

SUMMARY OF THE INVENTION

The solution of polarization dispersion according to the present invention involves coupling together substrates having different crystal cuts or lattice orientations; coupling together substrates of different materials that have a net polarization dispersion of zero; coupling together substrates using a polarization maintaining optical fiber; and beam splitting and combining for cancelling polarization dispersion. Coupled substrates of the correct length refractive index yield net polarization dispersion of zero, independent of the input state of polarization. The positive differential delay from one substrate is exactly compensated by the negative differential delay of the other. Thus, optical switching systems and networks of arbitrary size can be built without limits due to polarization dispersion induced by these devices.

BRIEF DESCRIPTION OF THE FIGURES

The invention will be better understood if reference is made to the accompanying drawings in which.

DETAILED DESCRIPTION OF THE PREFERRED EMBODIMENTS

The preferred embodiment of the invention is discussed in detail below. While specific steps, configurations and arrangements are discussed, it should be understood that this is done for illustrative purposes only. A person skilled in the relevant art will recognize that other steps, configurations and arrangements can be used without departing from the spirit and scope of the invention.

The preferred embodiment of the invention is now described with reference to the figures where like reference numbers indicate identical or functionally similar elements. Also in the figures, the left most digit of each reference number corresponds to the figure in which the reference number is first used.

Figure 1:
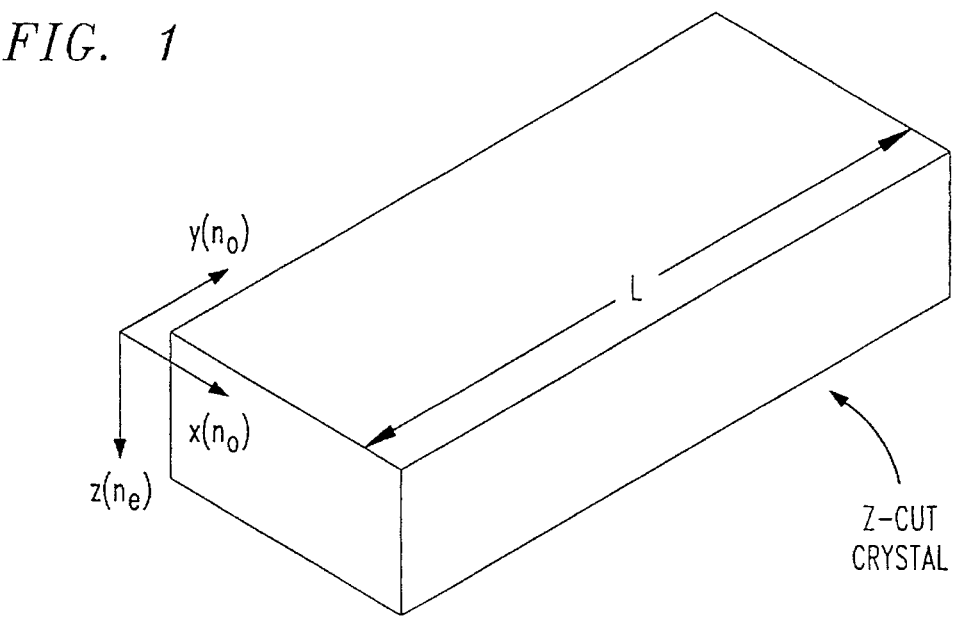
FIG. 1 shows a single substrate formed of lithium niobate and the two refractive indices, designated no (extraordinary) and no (ordinary).

Lithium niobate (LiNbO$_3$) has two refractive indices, designated $n_e$ (extraordinary) and $n_o$ (ordinary), as shown in FIG. 1. Light polarized along the z-axis, referred to as a fast optical axis, of the LiNbO$_3$ lattice is effected by the extraordinary index, while light polarized along either the x- or y-axis, referred to as a slow optical axis, of the lattice will be effected by the ordinary index.

Waveguides for modulators and switches are fabricated, for example, with the y-axis as the direction of propagation, which means that the polarization vectors are parallel to the x- and z-axes. If a single crystal cut is used (i.e., z-cut or x-cut) then polarization dispersion will result as an optical signal passes through the waveguide switch.

Table 1 shows the amount of differential delay caused by polarization dispersion (in picoseconds (ps)) for a signal passing through one, two or three switch modules each with two 6 centimeters (cm) long (L) substrates of z-cut crystal (assuming that two substrates are butt coupled in each module). Table 1 also shows the time delay (dispersion) as a percentage of the bit period for two common bit rates (gigabits per second (Gbits/sec)). The results in Table 1 represent a worst-case calculation as the assumption is made that the state and orientation of the polarization vector are maintained from one package to the next.

TABLE 1

| Number of packages | 1 | 2 | 3 |
|---|---|---|---|
| Total substrate length (cm) | 12 | 24 | 36 |
| Time delay (ps) | 32 | 64 | 96 |
| % of bit rate at 2 Gb/sec | 6.4% | 12.8% | 19.4% |
| % of bit rate at 10 Gb/sec | 32% | 64% | 96% |

Clearly, large polarization dispersion penalties can occur for high bit rate and/or large systems.

The time delays of Table 1 were generally determined according to Equation 1 as follows:

$$\Delta t = \frac{\Delta n L}{c} \quad (1)$$

where c=speed of light in vacuum, $$\Delta n = |n_o - n_e| = 0.08 \quad (2)$$

and where $n_o \approx 2.22$ and $n_e \approx 2.14$ in Equation 2.

The inventors have developed an optical switch module that eliminates the above-described polarization dispersion. An embodiment of the optical switch module of the present invention comprises a pair of substrates having two different substrate lattice orientations.

According to the preferred embodiment of the present invention, a first, x- (or y-) cut (crystal) substrate, which can have one or more optical waveguides, abutted against (or otherwise attached to) a second, z-cut substrate, which can also have one or more optical waveguides. Note that the order of the cuts does not matter, in other words, the z-cut could come first, then the x- (or y-) cut. The first and second substrates are of substantially the same length. For substrates of identical length, net polarization dispersion of an optical signal(s) through the compensated switch module is zero, independent of the input state of polarization of the optical signal. The positive differential delay of the first substrate is compensated by the negative differential delay of the second substrate (or vice versa).

The inventors have numerically estimated the extent of the polarization dispersion effect and the improvement attainable with this technique. For these calculations, a worst case situation in which the polarization remains aligned between each stage of switch modules was assumed. In this case, the "slow" polarization will always see the "slow" crystal axis and likewise for the "fast" polarization. In a real system, there will be a random variation of polarization from stage to stage which would soften the magnitude of the effect. However, it is necessary to address the worst case situation to assure system operation under all conditions.

The percentage of bit distortion due to polarization dispersion is given by Equation 3:

$$\% \text{ Distortion} = \frac{\Delta n \cdot L_{tot} \cdot BR}{c} \quad (3)$$

where $\Delta n$ is the birefringence; $L_{tot}$ is the total length (in centimeters) of the birefringent substrates through which the light passes; BR is the data transmission bit rate (in Gigabits per second); and c is the speed of light.

Given an assumption that acceptable system performance is obtained for distortions up to 10% of the bit period, then a figure of merit for lithium niobate can be derived, as follows:

$$L_{tot}(\text{cm}) \cdot BR(\text{Gbit/Sec}) \leq 37.5 \quad (4)$$

If the figure of merit is less than 37.5, system performance will be acceptable. As seen in Table 1, the length of high bit rate systems is severely hampered by this effect.

For systems in which the dispersion compensation technique has been used, a similar figure of merit applies, as represented in Equation 5:

$$L'_{tot} \cdot BR \leq 37.5 \quad (5)$$

but $L'_{tot}$ represents the total difference in length between substrates of one orientation and substrates of the alternate orientation. The required length tolerance between the alternately oriented substrates will depend upon the bit rate, as represented by Equation 6:

$$\frac{L'_{tot}}{L_{tot}} \leq \frac{37.5}{BR \cdot L_{tot}} \quad (6)$$

To illustrate the system improvement obtained by dispersion compensation, consider a very high bit rate system (20 Gbits/sec) and a switching matrix that requires 10 stages of 12 cm long switch elements. In this case, the uncompensated figure of merit (10×12×20=2400) far exceeds the system requirement. To apply the polarization compensation technique, assume that substrate lengths can be controlled to 0.1 cm (an easily maintained length tolerance). Again, make a worst case assumption, this time that all substrates of one orientation are shorter than the substrates of the other orientation. In this case, each 12 cm of substrate length has an effective polarization dispersion length of only 0.1 cm and the compensated figure of merit has an acceptable value of 20.

Figure 3:
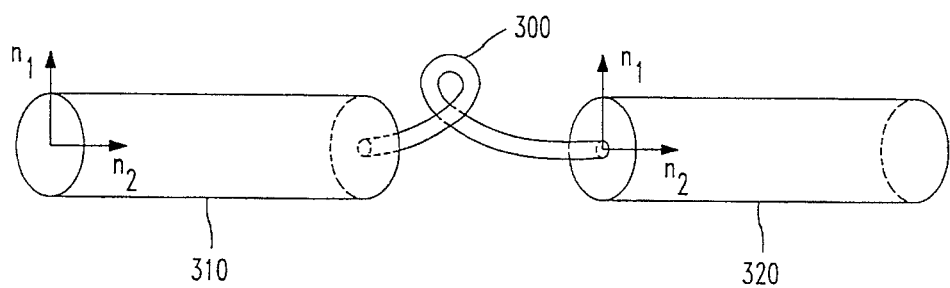
FIG. 3 shows a pair of substrates and a polarization maintaining optical fiber oriented to form a modulator or switch module that eliminates the deleterious effects of polarization dispersion, according to an embodiment of the present invention.
Figure 4:
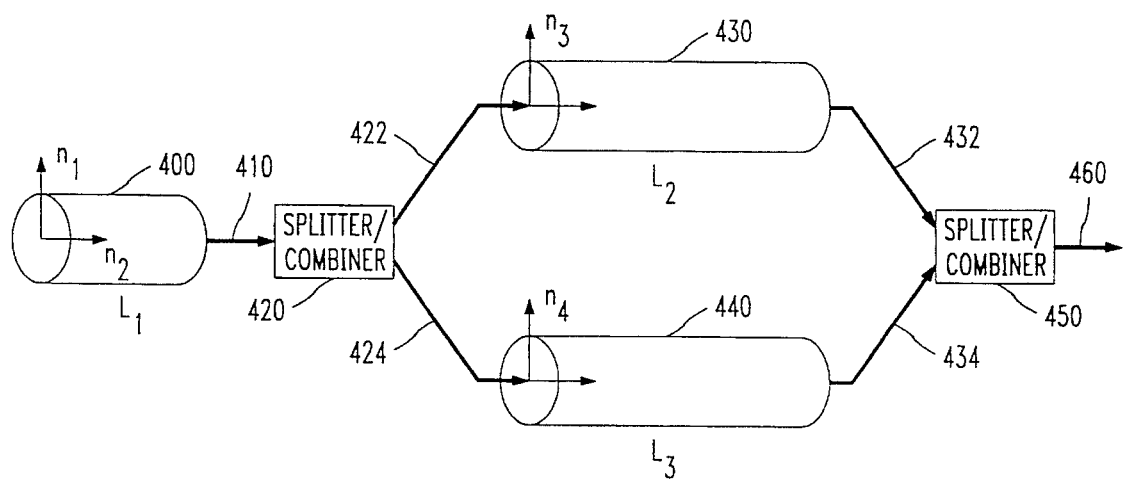
FIG. 4 shows three substrates and a pair of splitter/combiners oriented to form a modulator or switch module that eliminates the deleterious effects of polarization dispersion, according to an embodiment of the present invention.

Exemplary implementations of the present invention will now be described with reference to FIGS. 2–4.

Figure 2:
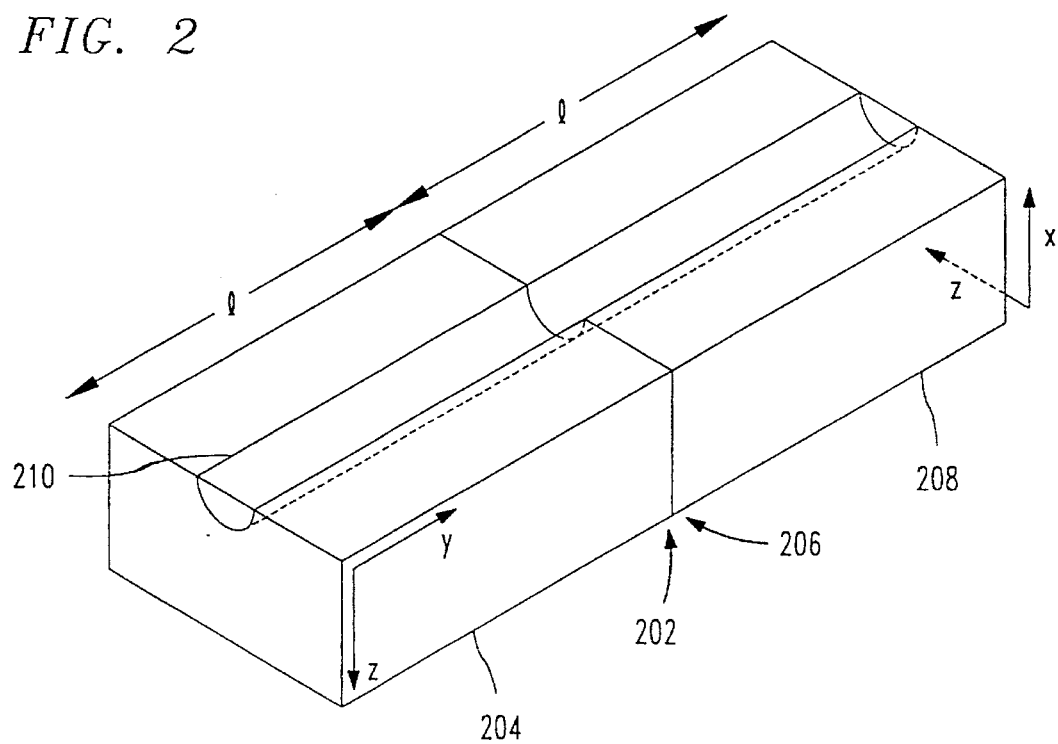
FIG. 2 shows a pair of lithium niobate substrates oriented to form a modulator or switch module that eliminates the deleterious effects of polarization dispersion, according to the present invention.

An example coupler 200 according to the present invention is shown in FIG. 2. An end 202 of a first, x- (or y-) cut substrate 204 is abutted against an end 206 of a second, z-cut substrate 208. The first and second substrates 202 and 204 are substantially of the same length l. The substrates are aligned such that $n_1$ is parallel to $n_3$ and $n_2$ is parallel to $n_4$. The two butt-coupled substrates 202 and 204 have essentially complimentary (i.e., non-like) orientations that cancel out the polarization dispersion.

A exemplary waveguide 210 for passing an optical signal between sections of a coupler, for example, is shown formed in the top surfaces of substrates 204 and 208. The present invention permits development of optical switching systems of arbitrary size, without limits due to polarization dispersion. The manufacturing of waveguides, waveguide switch matrices (comprising a column or columns of waveguides and switches in parallel), and the like, as well as their general operation are well known. Considerations, such as proper alignment of waveguides between the two substrates, the number and type of waveguides/coupling in each substrate, and the like, would be apparent to a person skilled in the relevant art.

In another embodiment of the present invention, two substrates of different material orientations are abutted such that a net polarization dispersion is zero. The first substrate has a first refractive index $n_1$, a second refractive index $n_2$, and a length of $L_1$. The second substrate has a first refractive index $n_3$, a second refractive index $n_4$, and a length of $L_2$. The two different substrates have a net polarization dispersion of zero if the following relationship is met:

$$L2 \approx \left( \frac{(n1-n2)}{(n4-n3)} \right) L1 \quad (7)$$

Equation 7 provides that if the refractive indices and dimensions of two substrates of different materials satisfy the equation, than the two substrates have a net polarization dispersion of zero.

In a third embodiment of the present invention, a solution of polarization dispersion is achieved by coupling a polarization maintaining optical fiber between two substrates with identical material orientations. Referring to FIG. 3, a polarization maintaining optical fiber 300 is placed between a substrate 310 and a substrate 320 to yield a net polarization dispersion of zero. The optical fiber 300 is positioned, twisted and coupled to substrates 310 and 320 such that an output of the substrate 310 is rotated 90° to an input of the substrate 320.

In a fourth embodiment of the present invention, a solution of the polarization dispersion is achieved by splitting and combining a beam to compensate for polarization dispersion. Referring to FIG. 4, a beam (i.e., optical signal) 410 output from a first substrate 400 that causes polarization dispersion is coupled to a beam splitter/combiner 420. The beam splitter/combiner 420 then splits the beam into two beams having orthogonal polarization states. The polarization that has experienced the fast axis of the first substrate 430 is directed along a path 422 to a second substrate 440. The lengths or optical indices of the second 430 and third 440 substrates are chosen such that they substantially reduce the polarization dispersion of the beams travelling along the fast and slow optical axes of the first substrate 400, respectively, as described above in connection with the other embodiments. The outputs of the second 430 and the third 440 substrate are then combined by the polarization splitter/combiner 450 to produce an output beam 460 with a net polarization dispersion of zero.

Polarization mode splitters (420 and 450) are well known and may be realized using a variety of methods. Bulk optical devices for accomplishing polarization beam splitting are commercially available from companies such as Newport Research Corp., Newport, Calif., JDS Optics, Inc., Ottawa, Ontario, Canada, and OZ Optics Ltd., Carp, Ontario, Canada. A waveguide technique is described by Bergland in U.S. Pat. No. 5,317,658.

While various embodiments of the present invention have been described above, it should be understood that they have been presented by way of example, and not limitation. It will be apparent to persons skilled in the relevant art that various changes in form and detail can be made therein without departing from the spirit and scope of the invention. For example, the present invention is applicable to other present or future materials that demonstrate polarization dispersion. Thus the present invention should not be limited by any of the above-described exemplary embodiments, but should be defined only in accordance with the following claims and their equivalents. All cited patent documents and publications in the above description are incorporated herein by reference.

What is claimed is:

1. An optical device for transmitting a combined optical signal having a first state of polarization and a second state of polarization, said optical device comprising:

a first substrate having a fast optical axis, a slow optical axis, a first end, and a first length;

a second substrate having a fast optical axis, a slow optical axis, a second end, and a second length; and means for optically coupling the combined optical signal from said first end to said second end, wherein said means substantially couples the first state of polarization that is polarized along the fast optical axis of the first substrate to the slow optical axis of the second substrate, and said means substantially couples the second state of polarization that is polarized along the slow optical axis of the first substrate to the fast optical axis of the second substrate, wherein the first and second lengths are selected such that the second substrate reduces polarization dispersion created in the first substrate such that a net polarization dispersion is approximately zero.

2. The optical device according to claim 1, wherein at least one of said first or said second substrates includes at least one optical waveguide.

3. The optical device according to claim 2, wherein the optical device comprises a waveguide modulator or switch.

4. The optical device according to claim 2, wherein the optical device comprises a plurality of waveguide modulators or switches.

5. The optical device according to claim 1, wherein said first substrate and said second substrate are comprised of the same material.

6. The optical device according to claim 5, wherein said material is lithium niobate.

7. The optical device according to claim 1, wherein one of said materials is lithium niobate.

8. The optical device according to claim 7, wherein said first length and said second length are substantially equal.

9. The optical device according to claim 1, wherein said first substrate and said second substrate are crystals having different cut types.

10. The optical device according to claim 1, wherein said first substrate and said second substrate are comprised of different materials.

11. The optical device of claim 1, further comprising at least one first waveguide that extends through an entire length of the first substrate and transmits the combined signal to the second end of the second substrate.

12. The optical device of claim 1, wherein the first and second substrates are formed of a same material and the first and second lengths are selected such that:

$$\% \text{ Distortion} = (\Delta n \cdot L_{tot} BR)/c < 10\%,$$

wherein $\Delta n$ is a differences between two refractive indices of the material, $L_{tot}$ is a total length of the first and second substrates, BR is a data transmission bit rate, and c is the speed of light.

13. The optical device of claim 1, wherein the first and second substrates are formed from first and second materials such that:

$$L_2 \approx ((n_1-n_2)/(n_4-n_3))L_1$$

where $n_1$ and $n_2$ are refractive indices of the first substrate and $L_1$ is the first length, $n_3$ and $n_4$ are refractive indices of the second substrate and $L_2$ is the second length.

14. A method to reduce the polarization dispersion of a combined optical signal having a first state of polarization and a second state of polarization, the method comprising the steps of:

providing a first substrate having a fast optical axis, a slow optical axis, a first end, and a first length;

providing a second substrate for reducing polarization dispersion created in the first substrate having a fast optical axis, a slow optical axis, a second end, and a second length;

passing the optical signal through said first and second substrates, wherein the first state of polarization is propagated along the fast optical axis of the first substrate ad the slow optical axis of the second substrate, and the second state of polarization is propagated along the slow optical axis of the first substrate and the fast optical axis of the second substrate, wherein the first and second lengths are selected such that the second substrate reduces polarization dispersion created in the first substrate such that a net polarization dispersion is approximately zero.

15. The method according to claim 14, further comprising the step of selecting said first length and said second length such that they are substantially equal to thereby substantially eliminate polarization dispersion.

16. The method according to claim 14, further comprising the step of providing said first substrate and said second substrate as crystals having different cut types.

17. The method according to claim 14, further comprising the step of providing said first substrate and said second substrate as the same material.

18. The method according to claim 14, further comprising the step of providing said first substrate and said second substrate as different materials.

19. The method of claim 14, further comprising providing at least one first waveguide that extends through an entire length of the first substrate and transmits the combined signal to the second end of the second substrate.

20. An optical device comprising:

a first substrate having a fast optical axis and a slow optical axis and an optical input end and an optical output end;

first means for performing polarization beam splitting having an optical input and two optical outputs, wherein said optical input is coupled to said optical output end of said first substrate;

a second substrate having an optical input end and an optical output end, wherein said optical input end is coupled to a first one of said outputs of said polarization beam splitter;

a third substrate having an optical input end and an optical output end, wherein said optical input end is coupled to a second one of said output ends of said polarization beam splitter; and second means for performing polarization beam combing having two optical inputs and at least one optical output end, wherein said first optical input is coupled to said optical output end of said second substrate and said second optical input is coupled to said optical output end of said third substrate;

wherein lengths or optical indices of said second or said third substrates are chosen to substantially reduce the polarization dispersion of an optical signal traversing said optical device.

21. A method to reduce the polarization dispersion of an optical signal, comprising the steps of:

providing a first substrate having a fast optical axis and a slow optical axis and an optical output end;

providing a second substrate having a fast optical axis and an optical input and an optical output end;

providing a third substrate having a slow optical axis and an optical input and an optical output end;

providing a polarization beam splitter having an optical input and first and second optical output ends;

coupling said optical output of said first substrate to said optical input of said polarization beam splitter, said first optical output of said polarization beam splitter to said optical input of said second substrate, and said second optical output of said polarization beam splitter to said optical input of said third substrate;

providing an optical combiner having first and second optical inputs and an optical output;

coupling said optical outputs of said second and third substrates to said first and second optical inputs of said coupler, respectively;

propagating the optical signal through said first substrate, said polarization beam splitter, said second and third substrates and out said optical output of said optical combiner, wherein lengths or optical indices of said second and said third substrates are chosen to substantially reduce the polarization dispersion of the optical signal propagating through the optical device.

22. An optical device for transmitting a combined optical signal having a first state of polarization and a second state of polarization, said optical device comprising:

a first substrate having a fast optical axis, a slow optical axis, and a first end;

a second substrate having a fast optical axis, a slow optical axis, and a second end;

means for optically coupling the combined optical signal from said first end to said second end, wherein said means substantially couples the first state of polarization that is polarized along the fast optical axis of the first substrate to the slow optical axis of the second substrate, and said means substantially couples the second state of polarization that is polarized along the slow optical axis of the first substrate to the fast optical axis of the second substrate, wherein the second substrate reduces polarization dispersion created in the first substrate such that a net polarization dispersion is approximately zero.

23. A method to reduce the polarization dispersion of a combined optical signal having a first state of polarization and a second state of polarization, the method comprising the steps of:

providing a first substrate having a fast optical axis, a slow optical axis, and a first end;

providing a second substrate for reducing polarization dispersion created in the first substrate having a fast optical axis, a slow optical axis, and a second end;

butt joining said first end of said first substrate to said second end of said second substrate, such that when coupled, the first substrate and the second substrate have a net polarization dispersion of approximately zero;

passing the optical signal through said first and second substrates, wherein the first state of polarization is propagated along the fast optical axis of the first substrate and the slow optical axis of the second substrate, and the second state of polarization is propagated along the slow optical axis of the first substrate and the fast optical axis of the second substrate.

24. An optical device for transmitting a combined optical signal having a first state of polarization and a second state of polarization, said optical device comprising:

a first substrate having a fast optical axis, a slow optical axis, and a first end;

a second substrate having a fast optical axis, a slow optical axis, and a second end; and means for optically coupling the combined optical signal from said first end to said second end, said means comprising a polarization maintaining optical fiber rotated at 90 degrees, wherein said means substantially couples the first state of polarization that is polarized along the fast optical axis of the first substrate to the slow optical axis of the second substrate, and said means substantially couples the second state of polarization that is polarized along the slow optical axis of the first substrate to the fast optical axis of the second substrate, wherein the second substrate reduces polarization dispersion created in the first substrate.

25. A method to reduce the polarization dispersion of a combined optical signal having a first state of polarization and a second state of polarization, the method comprising the steps of:

providing a first substrate having a fast optical axis, a slow optical axis, and a first end;

providing a second substrate for reducing polarization dispersion created in the first substrate having a fast optical axis, a slow optical axis, and a second end;

joining said first end of said first substrate to said second end of said second substrate with a polarization maintaining optical fiber rotated at 90 degrees;

passing the optical signal through said first and second substrates, wherein the first state of polarization is propagated along the fast optical axis of the first substrate and the slow optical axis of the second substrate, and the second state of polarization is propagated along the slow optical axis of the first substrate and the fast optical axis of the second substrate.

* * * * *